United States Patent
Greene et al.

(10) Patent No.: US 9,374,314 B2
(45) Date of Patent: Jun. 21, 2016

(54) QOS AWARE BALANCING IN DATA CENTERS

(71) Applicant: Palo Alto Research Center Incorporated, Palo Alto, CA (US)

(72) Inventors: Daniel H. Greene, Sunnyvale, CA (US); Lara S. Crawford, Los Altos, CA (US); John Hanley, Emerald Hills, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 438 days.

(21) Appl. No.: 13/688,035

(22) Filed: Nov. 28, 2012

(65) Prior Publication Data

US 2013/0223216 A1    Aug. 29, 2013

Related U.S. Application Data

(60) Provisional application No. 61/603,366, filed on Feb. 26, 2012.

(51) Int. Cl.
*H04L 12/56*    (2006.01)
*H04L 12/917*   (2013.01)
*G06F 9/48*     (2006.01)
*G06F 9/50*     (2006.01)

(52) U.S. Cl.
CPC .............. *H04L 47/76* (2013.01); *G06F 9/4893* (2013.01); *G06F 9/5083* (2013.01); *Y02B 60/144* (2013.01)

(58) Field of Classification Search
CPC ..... G06F 9/4893; G06F 9/5083; G06F 9/505; G06F 9/4408; G06F 9/45533; G06F 9/46; G06F 9/468; G06F 9/4856; G06F 9/4862; G06F 9/4875; G06F 9/4881; G06F 9/5038; G06F 9/5044; G06F 9/5061; G06F 9/5066; G06F 9/5077; G06F 17/30699; G06F 17/30864; G06F 2209/5019; G06F 15/173; G06F 8/443; G06F 9/5011; G06F 17/30463; G06F 17/30536; G06F 17/30702; H04L 47/76; H04L 47/125; H04L 69/329; H04L 47/24; H04L 47/805; H04L 49/205; H04L 47/822; H04L 65/80; H04L 41/5012; H04L 41/5003; H04L 41/5016; H04L 47/821; H04L 47/823; Y02B 60/144

See application file for complete search history.

(56) References Cited

U.S. PATENT DOCUMENTS

2001/0052016 A1* 12/2001 Skene ................. G06F 9/505
                                                       709/226
2009/0100172 A1    4/2009 Chen et al.

(Continued)

*Primary Examiner* — Kevin Bates
*Assistant Examiner* — Ranjan Pant
(74) *Attorney, Agent, or Firm* — Shun Yao; Park, Vaughan, Fleming & Dowler LLP

(57) ABSTRACT

One embodiment of the present invention provides a system for balancing loads between two physical resources. During operation, for each physical resource, the system establishes resource-usage models for a plurality of jobs that share the physical resource, identifies quality-of-service (QoS) levels associated with the jobs, and computes a QoS balance point for the physical resource based on the resource-usage models and the QoS ratings. The QoS balance point indicates a rating of QoS, above which substantial resource provisioning is required. In response to detecting a difference between a first QoS balance point associated with a first physical resource and a second QoS balance point associated with a second physical resource, the system identifies one or more jobs to be moved between the first and second physical resources such that the difference between the first and the second QoS balance points is reduced.

25 Claims, 5 Drawing Sheets

(56) References Cited

U.S. PATENT DOCUMENTS

| | | |
|---|---|---|
| 2010/0100877 A1 | 4/2010 | Greene et al. |
| 2010/0177650 A1* | 7/2010 | Wittgreffe ............... H04J 3/14 370/252 |
| 2010/0306776 A1* | 12/2010 | Greene ............... G06Q 10/10 718/101 |
| 2011/0069613 A1* | 3/2011 | Phillips et al. ............... 370/229 |
| 2011/0185064 A1* | 7/2011 | Head ............... G06F 9/5077 709/226 |
| 2011/0302578 A1* | 12/2011 | Isci ............... G06F 9/5077 718/1 |
| 2014/0165063 A1* | 6/2014 | Shiva ............... G06F 21/57 718/1 |

* cited by examiner

QOS AWARE BALANCING IN DATA CENTERS

RELATED APPLICATION

This application claims the benefit of U.S. Provisional Application No. 61/603,366, entitled "QoS Aware Balancing in Data Centers," by inventors Daniel H. Greene, Lara S. Crawford, and John Hanley, filed 26 Feb. 2012.

STATEMENT OF GOVERNMENT-FUNDED RESEARCH

This invention was made with U.S. Government support under Contract No. DE-EE0002898(3698) awarded by Government DOE/Power Assure. The U.S. Government has certain rights in this invention.

BACKGROUND

1. Field

This disclosure is generally related to data center operations. More specifically, this disclosure is related to a system that balances jobs among various physical resources to improve the quality-of-service (QoS) and energy efficiency of data center operations.

2. Related Art

Modern virtualization technologies have made it possible for data centers to run different jobs in a shared environment. In other words, the different jobs can share the same physical resources, such as memory, central processing unit (CPU), and bandwidth, all of which can be provided by a single machine or a cluster of machines. One important consideration for data center operations is to balance the jobs (or loads) among various machines or clusters of machines.

Balancing jobs in data center operations involves finding groups of jobs that will consolidate well, i.e., groups that can more effectively utilize the physical resources on a machine or a cluster of machines. Conventional approaches often ignore the QoS requirement associated with each job.

SUMMARY

One embodiment of the present invention provides a system for balancing loads between two physical resources. During operation, for each physical resource, the system establishes resource-usage models for a plurality of jobs that share the physical resource, identifies quality-of-service (QoS) levels associated with the jobs, and computes a QoS balance point for the physical resource based on the resource-usage models and the QoS ratings. The QoS balance point indicates a rating of QoS, above which substantial resource provisioning is required. In response to detecting a difference between a first QoS balance point associated with a first physical resource and a second QoS balance point associated with a second physical resource, the system identifies one or more jobs to be moved between the first and second physical resources such that the difference between the first and the second QoS balance points is reduced.

In a variation on this embodiment, identifying the one or more jobs to be moved is performed by a human operator.

In a variation on this embodiment, identifying the one or more jobs to be moved involves computing a marginal benefit of a move which can improve QoS balance. Furthermore, the system selects and completing a move based on the computation.

In a variation on this embodiment, the system determines a correlation of risks affected by movements of the one or more jobs. In response to the correlation of risks being smaller than a predetermined threshold, the system completes the movements.

In a variation on this embodiment, the resource-usage models are time varying, and the time-varying resource-usage models are established based on resource-usage histories associated with the jobs.

In a variation on this embodiment, the system measures a complementarity level between two jobs. In response to the complementarity level exceeding a predetermined threshold, the system places the two jobs on a same physical resource.

In a further variation, measuring the complementarity level involves calculating a time correlation between peak resource usages associated with the two jobs.

In a variation on this embodiment, the system identifies a job to be placed on a particular physical resource based on one or more of: a location of one or more other related jobs, a network connectivity requirement associated with the job, and a security requirement associated with the job.

BRIEF DESCRIPTION OF THE FIGURES

In the figures, like reference numerals refer to the same figure elements.

DETAILED DESCRIPTION

Figure 1:
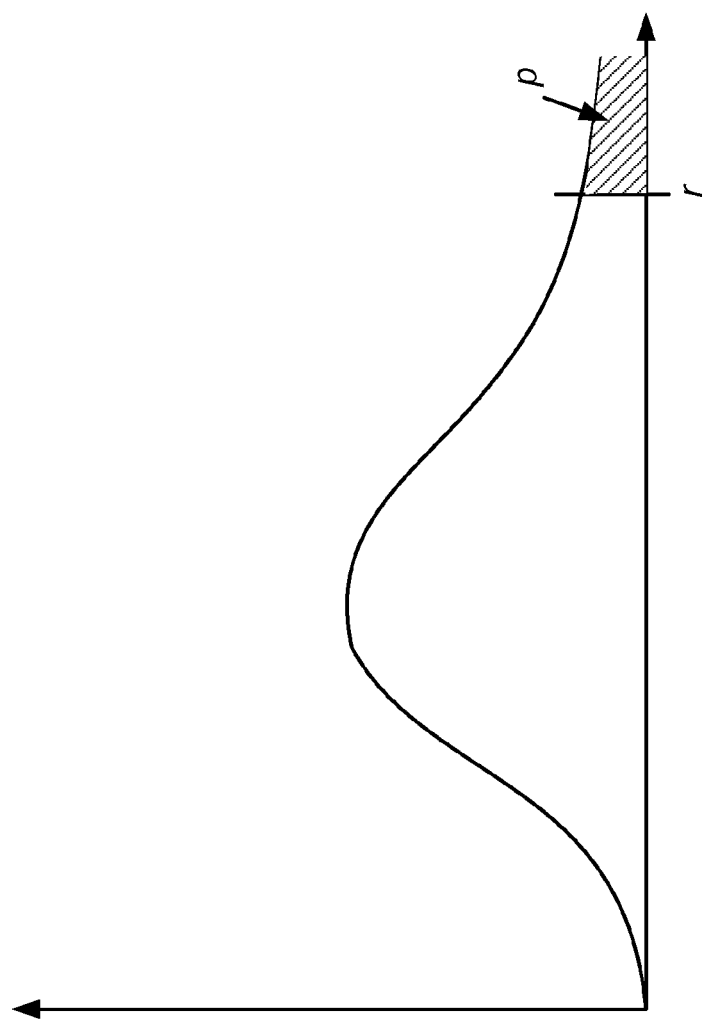
FIG. 1 presents a diagram illustrating the probability density function (PDF) as a function of resources, and the reserved resources for an exemplary job.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for balancing loads among physical resources in a data center. More specifically, the system allocates jobs as a group to various resources based on the QoS requirement of the jobs, as well as other criteria, such as complementarity and risk correlations of the jobs. During operation, the system identifies the required QoS for the jobs, and establishes resource-usage models for the jobs based at least on historical data. The system then computes a QoS balance point for each resource based on the QoS ratings and the resource-usage models of the jobs currently assigned to the resource. Based on the QoS balance points, an automatic controller or a human administrator can move jobs among resources to even out the balance points, thus enhancing the group utilization of the resources.

In this disclosure, the term "physical resource" refers to various types of physical equipment needed for finishing a computing job. It can include processing capability, storage space, communication bandwidth, input/output, etc. Moreover, a particular "physical resource" can refer to a single machine, a cluster of machines, or all machines in a data center. Moreover, the terms "physical resource" and "physical machine" are interchangeable.

In this disclosure, the term "job" refers to a computational task in a shared environment. More specifically, a job can be a virtual machine instance or a collection of virtual machine instances.

Statistical Packing

There are several important considerations for load placement in data center operations. For example, to find groups of jobs that consolidate well, i.e., groups of jobs that can more effectively utilize the physical resources, one needs to consider whether the load patterns of the jobs are complementary, whether grouping certain jobs reduces risk, and whether a group of jobs includes a mix of QoS requirements. Each of these considerations can have a significant impact on how a group of jobs will behave when they run together on a particular physical resource. Moreover, in actual situations, depending on the particular jobs involved, one or more of these considerations may be dominant.

In a virtualized environment, jobs can share physical resources. Usually a job obtains resources by making reservations, thus guaranteeing that it will do at least as well as having its own physical machine. However, when reserved resources are not needed by a current job, they can be shared with other jobs. "Statistical packing" refers to a mechanism that determines reservations for a group of jobs together. Rather than having each job determine its own reservation, this group approach can take better advantage of the additional sharing possible in a virtualized environment.

For example, consider a simple "group" consisting of only two jobs, both with substantial uncertainty about their resource needs, but one with a high QoS requirement and one with a low QoS requirement. Making individual reservations means that each job needs to have a "buffer" of additional resources to deal with uncertainty. However, if we determine their reservations together, it is likely that the large reservation necessary for the high QoS job will so frequently be available for the low QoS job; hence, very little resource reservation will be necessary for the low QoS job.

To better formulate statistical packing, we need to first define a QoS level and how the QoS level of a job is linked to its reservation of resources. The general use of the term "QoS" refers to how well a job meets its objective. For some applications, the objective might be measured in average delay or in completed transactions. Unfortunately, different applications have different metrics that are important to them. It can be difficult to apply these different metrics in a general-purpose setting: the impact of poor metrics will vary between applications, and when metrics are sub-standard it can be unclear if the fault is due to poorly written applications or due to poor assignment of resources in a virtual environment.

To simplify and unify the treatment of QoS across diverse applications, a more general-purpose approach, which is considered to be the gold standard, is to fully provision a job with all the resources it needs. It is then the job's responsibility to deliver good performance on the application-relevant metrics. Such a full provisioning will usually require reserving more resources than necessary because it is usually not possible to predict exactly how many resources the job will need. Even with these extra reservations, there is still risk of shortfall. In this disclosure, we describe the level of QoS delivered by a job as the chance that the gold standard of full provisioning will not be met. In other words, a job with QoS level p will not receive all requested resources with a probability p, during a measured interval. Note that QoS level p should not be confused with a job failure probability. Most modern applications are written well enough that they can perform adequately even when they do not have 100% of the requested resources. For example, an application under heavy load might temporarily deliver lower resolution images, or an application running in batch mode might start early to ensure completion by a deadline. However, resilience to resource shortfall is again an application-specific characteristic. To simplify the general-purpose management of resources, we assume the worst when the gold standard is not met. To avoid confusion we will refer to this failure to fully provision as a "shortfall" situation. Note that the appropriate setting of the QoS level p (i.e., the allowed "probability of shortfall") will be greater than the allowed probability of failure for the job.

An important benefit of using QoS specifications (or QoS levels) in load placement is better risk management. By specifying allowed "probabilities of shortfall," the system can more carefully manage the risks taken, thus resulting in a reduction of risk on the critical, high QoS jobs managed by the system.

Two measures can be used for monitoring the resource usages of jobs over time: the directly measured resource usage, denoted as $x_t$; and the amount of resources necessary to meet the QoS requirement, denoted as $r_t$. In a virtualized environment, $r_t$ could be a necessary resource reservation, which usually will exceed the actual usage $x_t$. It is important to note that $r_t$ includes both direct (actually used) and indirect (e.g., reserved buffer and possible idle) resource usage. In general, it is possible to measure $x_t$, whereas the QoS-protected usage $r_t$ is harder to determine. If the monitoring tool has a stochastic model of the job, that is, a model that can provide a distribution $\phi_t(z)$ over future possible resource needs, then $r_t$ can be determined from the cumulative distribution and the QoS specification. More specifically, given the cumulative distribution:

$$\Phi(y) = \int_{-inf}^{y} \phi(z), \qquad (1)$$

and the QoS level p (the allowed probability of shortfall), one can obtain:

$$r_t = \text{inverse } \Phi(1-p). \qquad (2)$$

FIG. 1 presents a diagram illustrating the probability density function (PDF) as a function of resources, and the reserved resources for an exemplary job. From FIG. 1, one can see that the reserved resources $r_t$ is large enough that the cumulative probability in the remaining tail of the distribution curve is less than the allowed probability of shortfall. Note that, when monitoring, $r_t$ does not necessarily correspond to the actual reservation made for a job. In many cases actual reservations have been set manually, and they might correspond to physical resources that the job once had before virtualization. Before virtualization there was also a risk of shortfall, but usually without careful QoS considerations, so these reservations may or may not meet the QoS performance of $r_t$, as computed by Eq. (2). Instead, the monitoring tool must first measure and model $x_t$ before $r_t$ can be derived.

Given the expression of $r_t$, we can now formulate the algorithm of statistical packing. For a collection of jobs, where each job's resource needs in the next time step are described by a distribution $\phi(z)$ and a QoS level p, the individually computed reservation for each job can be calculated as:

$$r^{(i)} = \text{inverse } \Phi^{(i)}(1-p^{(i)}), \quad (3)$$

and the total reservation for all jobs will be:

$$r^T = \sum_{i=1}^{n} r^{(i)}. \quad (4)$$

Statistical packing can reduce the total reservation. Without the loss of generality, one can assume that the jobs are sorted in descending order of QoS, thus the ascending order of $p^{(i)}$. For independent jobs, the combined distribution of the resource needs, $\phi^T(z)$, is the convolution of the individual distributions, $\phi^{(i)}(z)$, written as:

$$\phi^T(z) = \bigotimes_{i=1}^{n} \phi^{(i)}(z). \quad (5)$$

Let k be the smallest index such that the partial sum of the reservations $$\left( \hat{r}^{(k-1)} = \sum_{i=1}^{k-1} r^{(i)} \right)$$

plus a partial reservation at k, which will be denoted $s^{(k)}$ (partial mean that $s^{(k)} < r^{(k)}$, the individual reservation required for job k). The partial sum and partial reservation is large enough to meet the entire group needs at the QoS level $p^{(k)}$. That is:

$$\hat{r}^{(k-1)} + s^{(k)} = \text{inverse } \Phi^T(1-p^{(k)}). \quad (6)$$

Then, jobs 1, 2, . . . , k can obtain reservations $r^{(1)}$, $r^{(2)}$, . . . , $r^{(k-1)}$, $s^{(k)}$, and no reservation is given to the remaining jobs. Although without a reservation, the remaining jobs can safely meet their QoS requirements by making use of the unused reservations of the first k jobs. It is clear that the total reservation for statistical packing, as shown in Eq. (6), is significantly reduced from the total reservation shown in Eq. (4). It is understood that there are several variations possible for the statistical packing algorithm, see for example US Patent Application Publication 2010/0100877 A1, "Statistical Packing of Resource Requirements in Data Centers" by Daniel H. Greene, Maurice Chu, Haitham Hindi, Bryan T. Preas, and Nitin Parekh, and US Patent Application titled "Long Term Resource Provisioning with Cascading Allocations" by Daniel H Greene, Lara Crawford, Maurice K Chu, and John Handley, being filed simultaneously with this application. In particular, it is not necessary that the jobs be independent as in equation (5), rather a combined distribution of correlated jobs can be learned. The balancing techniques of this patent can be based on any of a variety of statistical packing methods.

Other Load-Placement Considerations

The statistical packing algorithm described in the previous section can be applied to candidate groupings of jobs, to see which would have the best consolidation, and to determine where migrations of jobs between physical resources might benefit the consolidation. In other words, there is a simple measure of how well group consolidation works, which is to pack the jobs and determine the total resources reserved. Better packing means reservation of fewer resources while meeting the group QoS requirements.

However, rather than use this measure alone, it sometimes helps to look at other considerations for group consolidation, such as complementarity of load patterns, risk-reduction potential, and balancing of QoS among resources. These considerations can give a human operator more insight into why group consolidations work well, and accelerate the computation of groupings so that the computation does not have to explore large numbers of different groupings to find the best consolidation.

The most fundamental consolidation consideration is the complementarity of load patterns. For example, if one job always runs at midnight, and another job always runs at 5 pm, then these two jobs have complementary load patterns and can easily share the same physical resources. For loads to be complementary, they must have predictable temporal load patterns that have high loadings at different times. In addition, they should be almost uncorrelated.

For a monitoring tool, it is useful to have ways of measuring complementarity, which is related to the long time-scale correlation of the jobs. Given a sequence of measurements of usage, either the actual time-varying usage $x_t$, or after modeling is applied, the QoS-protected usage $r_t$, one can compute the correlation between two jobs as:

$$\text{corr}(z^{(1)}, z^{(2)}) = \frac{\sum_t (z_t^{(1)} - \bar{z}^{(1)})(z_t^{(2)} - \bar{z}^{(2)})}{\sqrt{\sum_t (z_t^{(1)} - \bar{z}^{(1)})^2 \sum_t (z_t^{(2)} - \bar{z}^{(2)})^2}}, \quad (7)$$

where $z_t$ denotes the available usage measurement (i.e., $x_t$ or $r_t$), and $\bar{z}$ denotes the average usage. Note that, although it's possible to measure complementarity using either $x_t$ or $r_t$, the harder-to-compute $r_t$ would be preferred, especially when high QoS jobs are involved. Moreover, for purposes of determining how well two jobs might share the same resource, it is often better to measure the correlation of their peak needs:

$$\text{max\_corr}(z^{(1)}, z^{(2)}) = \frac{\max_t (z_t^{(1)} + z_t^{(2)})}{\max_u (z_u^{(1)}) + \max_v (z_v^{(2)})}, \quad (8)$$

where the different indices t, u, and v are used to indicate that these maximums do not necessarily occur at the same time. Note that the metric shown in Eq. (8) can be generalized to measure correlated peak needs of multiple jobs. Note that, if the correlated peak needs between two jobs are smaller than a threshold, or if the complementarity level between two jobs is larger than a threshold, it is desirable to place these two jobs on the same machine.

While some beneficial balancing can be achieved by placing complementary jobs on the same physical resource (e.g., in the same machine or cluster), there is usually a limit to how much balancing can be achieved with this consideration alone. In practice, there are usually a few heavy load times, such as weekday afternoons, that require more resources regardless of how jobs are grouped. Energy savings can be achieved by using packing to turn off extra resources at off-peak times. However, balancing and packing to improve the consolidation for peak needs will determine the overall capacity of the data center. Beyond achieving the benefits of complementarity, other considerations can also improve consolidation, and expand the capacity of the data center.

Except for a few batch jobs, most jobs in a data center have unpredictable resource needs. For example, their needs might depend on the number of visitors to a website or the volume of transactions in a market. To ensure that jobs have the resources they need, it is usually necessary to reserve more resources than what will actually be required. However, having each job individually reserve an extra "buffer" of resources to cover the unpredictable resource needs can be wasteful. Instead, there is an opportunity for consolidation by pooling these extra resources, much like an insurance company can pool risks. This requires that the risks be uncorrelated. For example, it is much easier for an insurance company to insure small-scale individual fires, than large-scale earthquakes. Generally speaking, the risk-reduction consideration suggests placing pools of jobs with uncorrelated risk onto the same physical resource.

To measure the risk reduction opportunity among jobs, it is necessary to look at the short time-scale correlation of jobs. Take, for example, a situation where each of the two jobs has the same QoS level p, and the predicted resource needs in the next time step are given by distributions $\phi^{(1)}(z)$ and $\phi^{(2)}(z)$. If these distributions are independent, then risk can be reduced by considering the resource needs of the jobs together. Suppose the jobs are normally distributed with means $\mu^{(1)}$ and $\mu^{(2)}$, and standard deviations $\sigma^{(1)}$ and $\sigma^{(2)}$. The normal distribution is unrealistically well behaved, but it will serve as a good illustration. Using the Chernoff bound for the area of the tail of the normal distribution:

$$Q((x-\mu)/\sigma) = \frac{1}{2} e^{-\frac{1}{2} \frac{(x-\mu)^2}{\sigma^2}}, \quad (9)$$

the required individual reservation for each of these jobs, to achieve a QoS level p, will be:

$$r^{(1)} = \mu^{(1)} + \sigma^{(1)} \sqrt{-2\log(2p)}, \quad (10)$$

$$\text{and } r^{(2)} = \mu^{(2)} + \sigma^{(2)} \sqrt{-2\log(2p)}. \quad (11)$$

However, the combined resource needs of these jobs is normally distributed with mean $\mu^{(1)} + \mu^{(2)}$, and standard deviation $\sqrt{(\sigma^{(1)})^2 + (\sigma^{(2)})^2}$.

So, an appropriate combined reservation will be:

$$r^{(T)} = \mu^{(1)} + \mu^{(2)} + \sqrt{(\sigma^{(1)})^2 + (\sigma^{(2)})^2} \sqrt{-2\log(2p)}. \quad (12)$$

Note that there is a reduction in the required reservation, $r^{(T)} < r^{(1)} + r^{(2)}$, because the combined standard deviation does not grow linearly with the individual standard deviations. The combination of independent jobs results in a risk reduction, much like an insurance company achieves risk reduction by pooling multiple independent risks. For example, combining n jobs with the same a would result in a reduction of $1/\sqrt{n}$ in the $\sigma$ term of the combined reservation (the portion due to uncertainty). So, roughly speaking, there is a $1/\sqrt{n}$ reduction that derives from combining independent jobs on the same physical resource.

Because of the importance of the jobs being nearly independent, to measure the potential for risk reduction one needs to measure the degree to which the uncertainty in jobs is independent. One measure is the short time-scale correlation between the jobs:

$$\text{corr}(z^{(1)}, z^{(2)}) = \frac{E((z_t^{(1)} - \bar{z}^{(1)})(z_t^{(2)} - \bar{z}^{(2)}))}{E(z_t^{(1)} - \bar{z}^{(1)}) E(z_t^{(2)} - \bar{z}^{(2)})}. \quad (13)$$

Note that the expectations are computed using the distributions $\phi^{(1)}(z)$ and $\phi^{(2)}(z)$ for the next time step, and the correlation will not depend on the mean values of these distributions. However, the long time-scale correlation, described by Eq. (7), will account for the means moving together over sequential time steps. Because we are most interested in the correlation between jobs when their resource needs are high, a better measure of correlation is the "mean shift" induced by a job:

$$\text{mean\_shift}(r, z^{(1)}, z^{(2)}) = E(z^{(2)} | z^{(1)} \geq r) - E(z^{(2)}), \quad (14)$$

which gives some insight on how likely it is that a job that has exceeded its own reservation r will find that another jobs has also taken extra resources. The mean shift calculated by Eq. (14) generalizes easily to a mean shift between a single job and another group of jobs. In the case of well-behaved distributions, such as joint Gaussian distributions, the induced mean shift is directly related to the correlation, as shown below:

$$\text{mean\_shift}(r, z^{(1)}, z^{(2)}) = \text{corr}(z^{(1)}, z^{(2)}) \frac{\sqrt{\frac{2}{\pi}} \sigma^{(2)} e^{-\frac{(r-\mu^{(1)})^2}{2(\sigma^{(1)})^2}}}{\text{Erf}\left(\frac{r-\mu^{(1)}}{\sqrt{2}\sigma^{(1)}}\right)}. \quad (15)$$

However, in real-world distributions, these may not be so directly related, and the mean shift measure computed empirically according to Eq. (14) may be more relevant for resource allocation.

Another important consolidation consideration is whether jobs on the same physical resource have a good mixture of QoS requirements. When jobs with uncertain resource needs are consolidated on the same physical resource, it helps to have a mixture of different QoS requirements among the jobs. In other words, one should avoid placing jobs with high QoS requirements on a same machine, and vice versa. With statistical packing, there is a nice benefit when a large reservation made to meet the needs of a high QoS job can also meet the needs of a low QoS job. This derives from the fact the high QoS job's reservation will be needed so infrequently that these usually idle resources are adequate to serve the low QoS jobs. In other words, on a physical resource running jobs with well-mixed QoS, the low QoS jobs can successfully scavenge the unused reservations of the high QoS jobs.

Since the benefits of group consolidation are highest when a mixture of high and low QoS jobs share the same physical resource, there may be significant benefits from using QoS considerations to balance loads between physical resources in order to enhance the benefits of group consolidation. As described in the previous section, when multiple jobs are consolidated on a common physical resource, it is possible to reduce the total amount of resources required because the jobs can share some of the additional protective reservations necessary to meet QoS requirements.

While all kinds of jobs benefit from sharing resources, there is a particularly good synergy between high QoS jobs that require large amounts of reserved resources and low QoS jobs that can successfully scavenge idle resources on an "as-available" basis to meet their low QoS requirements. Here we introduce the concept of a QoS balance point for each physical resource running multiple jobs. The intention is that the higher QoS jobs are balanced with the lower QoS jobs. To quantitatively describe the QoS balance point, we also need to introduce the concept of a QoS rating (Q_r). Each job has a positive real-valued QoS rating that reflects the QoS requirement associated with the job. There are a variety of methods for assigning a QoS ratings, for example, a QoS rating can be based on the individual reservation in equation (3), or they may be based on a priority computed from a job's QoS and its recent resource consumption. High QoS jobs have high QoS ratings, and vice versa. Note that the QoS rating is not to be confused with the QoS level p, which is the allowed probability of shortfall of a job. QoS rating is often inversely correlated with the QoS level, i.e., smaller allowed shortfall probabilities lead to higher QoS ratings.

For each level of physical resource organization, a QoS balance point can be computed by finding k in Eq. (6). In other words, the balance point for a group of jobs is the QoS rating at the index k determined by the statistical packing algorithm (Eq. (6)). While the balance value is based on the QoS rating, its critical characteristic is its location at the point in the QoS ordering where the statistical packing is transitioning to relying more significantly on sharing. The method for assigning QoS ratings to individual jobs plays a role in comparing the balance point with the balance points on other physical resources where jobs might be migrated. Methods for computing the QoS ratings of individual jobs, for example, based their individual reservation requirement, while not reflecting the consolidation results, allow the balance points computed, which do reflect consolidation results, to be compared between physical resources.

Figure 2:
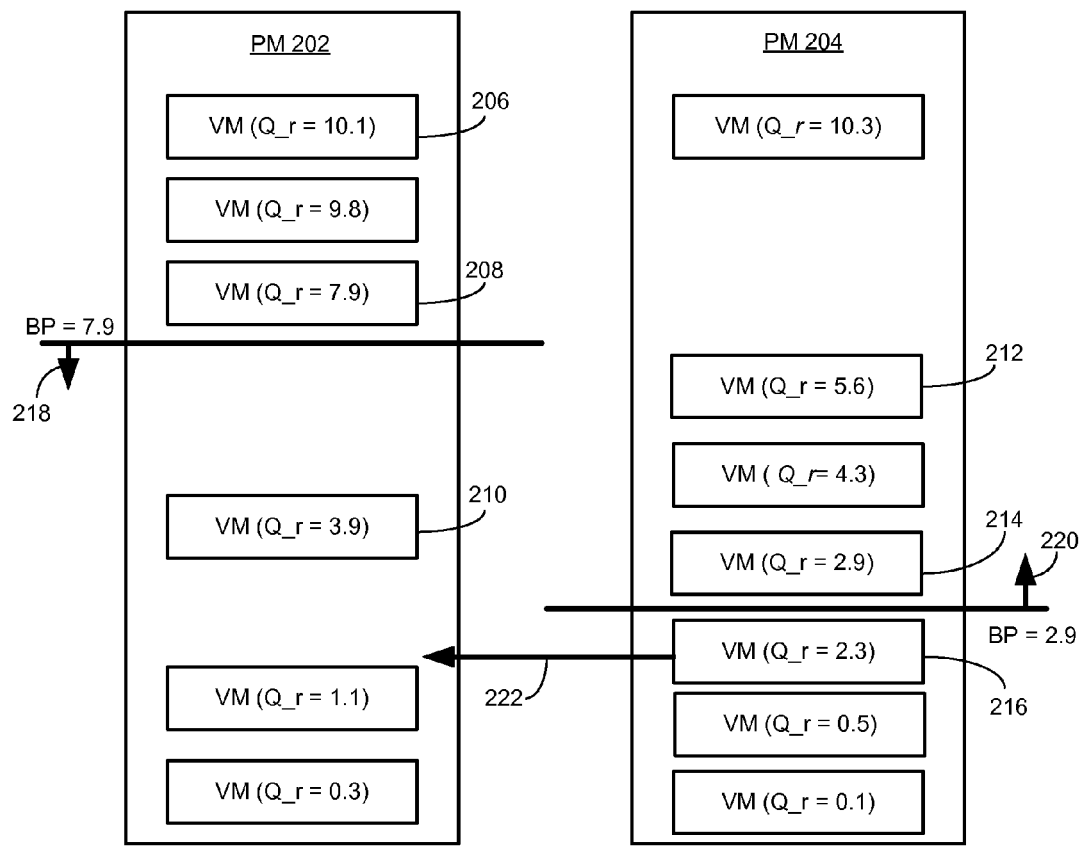
FIG. 2 presents a diagram illustrating a situation where two machines are "out of balance," in accordance with an embodiment of the present invention.

QoS balance points offer a simple, clear signal that there might be an opportunity to improve group performance. For example, if all the physical machines in a cluster have roughly the same QoS balance point, then the cluster is "in balance." On the other hand, if two machines have significantly different balance points, the two machines are "out of balance." Hence, a job migration may improve the balance, thus the overall cluster performance. FIG. 2 presents a diagram illustrating a situation where two machines are "out of balance," in accordance with an embodiment of the present invention. In FIG. 2, a physical machine (PM) cluster 200 includes a PM 202 and a PM 204, each running a number of virtual machines (VMs), or jobs. For example, PM 202 runs VM 206, VM 208, VM 210, etc.; and PM 204 runs VM 212, VM 214, VM 216, etc. Each VM has its own QoS requirement. For example, the QoS ratings for VMs 206, 208, and 210 are 10.1, 7.9, and 3.9, respectively.

Based on the QoS rating and resource needs of each job currently running on a PM, the system is able to compute the QoS balance point for that PM. In one embodiment, the statistical packing algorithm described earlier is used to compute the QoS balance point. For example, based on statistical packing, the system determines that for PM 202, by making full reservations for VMs having QoS ratings greater than VM 208 and a partial reservation for VM 208, resources needs and QoS requirements for all VMs running on PM 202 can be satisfied. In other words, the QoS balance point for PM 202 is the QoS rating of VM 208, which is 7.9. Note that, if the statistical packing algorithm described earlier is used, no reservation is made for VMs having QoS ratings lower than that of VM 208, such as VM 210. However, those VMs with lower QoS ratings can successfully scavenge unused resources reserved for the jobs with higher QoS ratings. Similarly, the system determines that for PM 204, by making full reservations for VMs having QoS ratings higher than VM 214 and a partial reservation for VM 214, resource needs and QoS requirements for all VMs running on PM 204 can be satisfied. In other words, the QoS balance point for PM 204 is the QoS rating of VM 214, which is 2.9.

Note that statistical packing provides ways for making group reservations. That is, all VMs in PM 202 make resource reservations as a group, thus significantly reducing the amount of reserved resources for the group. However, if we consider PM 202 and PM 204 as a cluster and would like to improve the overall performance of the cluster, we would need to balance the QoS balance points between these two machines.

From FIG. 2, one can see that PM 202 and PM 204 have significantly different QoS balance points, one at 7.9 and one at 2.9. Hence, to improve balance, thus system performance, one needs to improve the balance by lowering the balance point of PM 202 (shown by arrow 218) while increasing the balance point of PM 204 (shown by arrow 220). Note that the QoS balance point has an intuitive interpretation very close to that of the center of mass of a physical object. For a physical object, adding mass to one side will shift the center of mass toward that side. In the case of resource consolidation, the high QoS jobs above the QoS balance point require individual protective reservations to preserve their QoS. In contrast, the lower QoS jobs below the QoS balance point deliver their QoS with the pool of capacity in the reservation already made for the high QoS jobs. There is only a limited capacity in this pool, so adding more low QoS jobs to one machine will shift the QoS balance point toward the lower QoS jobs; eventually some of them will cross the QoS balance point and require individual protective reservation. In other words, adding more jobs with QoS ratings lower than the QoS balance point will lead to a downward shift of the QoS balance point, while removing a job with a lower QoS rating will shift the balance point upward. Therefore, as indicated by arrow 222, a migration of job 216, which has a QoS rating lower than the QoS balance point of PM 204, from PM 204 to PM 202 may lead to an increase in the QoS balance point of PM 204 while decreasing the QoS balance point of PM 202. This tends to even out the balance points on the two machines and improve the overall performance of the cluster (fewer resources will be required to meet all the QoS requirements in the cluster). Note that it is also possible to move job 208 from PM 202 to PM 204. Such job migration can also lower QoS balance point of PM 202 and increase the QoS balance point of PM 204.

However, just because the balance points are moving in the right direction, there is no guarantee that the migration will be an improvement to the overall performance. For example, the balance points could shift too far, causing new imbalance, or other considerations, like risk-reduction potential, could make things worse. In practice, the balance points signal a promising opportunity, while an actual marginal cost calculation, based on before and after packing computations, can be used to compute the actual benefit, and to decide if the migration is an improvement. The advantage of the balance points is that they provide a good way of identifying promising opportunities, thus reducing the computation needed for finding good migrations. Moreover, when used as part of load-monitoring tools, the balance points provide insights for human users about how well QoS is implemented.

Many data centers include a variety of additional constraints affecting how jobs may be located on physical resources. Typical constraints include: locations of other related jobs, network connectivity requirements, and security requirements. For example, it may be required that some related jobs be placed in the same cluster, be placed in a cluster with good external network connectivity, or be placed in a specially secured cluster. These kinds of constraints must be respected as jobs are grouped to improve consolidation.

Figure 3:
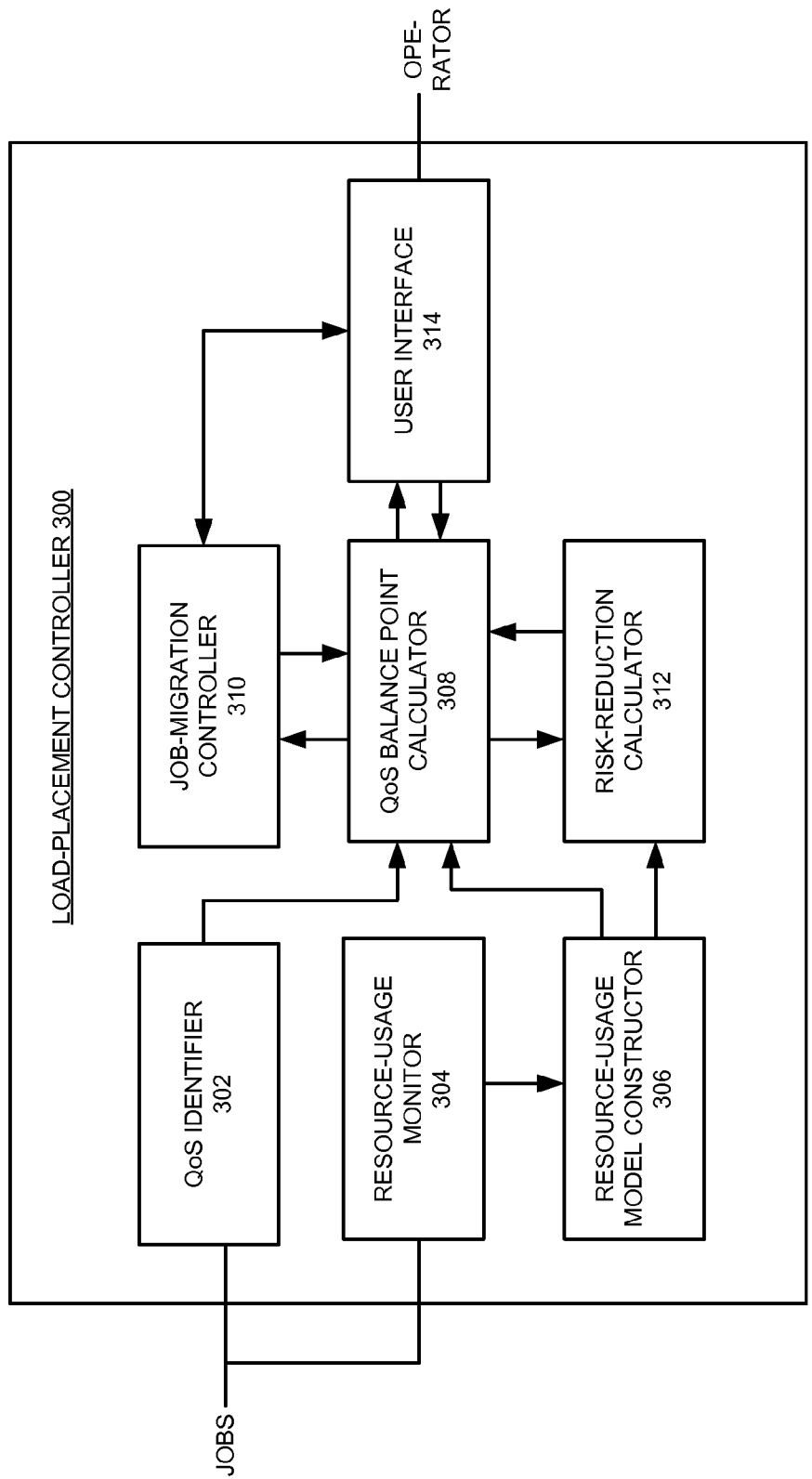
FIG. 3 presents a diagram illustrating a load-placement controller for data center operations, in accordance with an embodiment of the present invention.

FIG. 3 presents a diagram illustrating a load-placement controller for data center operations, in accordance with an embodiment of the present invention. In FIG. 3, load-placement controller 300 includes a QoS identifier 302, a resource-usage monitor 304, a resource-usage model constructor 306, a QoS balance point calculator 308, a job-migration controller 310, a risk-correlation calculator 312, and a user interface 314.

Load-placement controller 300 controls the load placement in a cluster of physical machines in order to achieve the best performance for the cluster. QoS identifier 302 identifies the QoS requirements associated with each job in the cluster. Resource-usage monitor 304 monitors the resource needs for each job, which can be totally random or have a certain temporal pattern. Resource-usage model constructor 306 receives information from resource-usage monitor 304 and constructs a resource-usage model for each job accordingly. In one embodiment, the resource-usage model includes a resource-needs distribution function, which indicates the probability of a job needing a certain amount of resources. In a further embodiment, the resource-usage model includes a temporal distribution of the resource needs of a job. For example, the probability of certain jobs needing a large amount of resources in the morning may be high. In a further embodiment, the resource-usage modeling is computed for groups of jobs that may have correlated resource needs.

Based on the constructed resource model and the QoS requirement for each job running on a particular PM, QoS balance point calculator 308 computes a QoS balance point for that PM. In one embodiment, a statistical packing algorithm is used to compute the QoS balance point, which indicates a QoS rating that is selected in a way that QoS-protected reservations made for jobs having equal or higher QoS ratings can sufficiently meet the resource needs and QoS requirements for all jobs on that PM. In one embodiment, QoS balance point calculator 308 calculates a QoS balance point for each PM in the cluster.

In one embodiment, the calculated QoS balance points are presented to a human administrator, who can observe QoS imbalances between PMs and, in turn, suggest job migrations that can improve the QoS balance. The job-migration suggestions are sent to job-migration controller 310, which controls which jobs are migrated, and in which direction. The job-migration controller 310 may incorporate further considerations, such as complementary and risk reduction. For some of the suggested migrations a marginal benefit computation may be computed using a statistical packing algorithm. In a further embodiment, job-migration controller 310 determines how to migrate jobs with the intervention of a human administrator, who is provided with balance information, and possibly other metrics described above. Job-migration controller 310 also needs to take other considerations into account before making the final job-migration decision. In one embodiment, job-migration controller 310 considers the complementarity of jobs, and favors migration suggestions that place jobs that have complementary temporal patterns on one PM. In one embodiment, the proposed job migration is sent back to QoS balance point calculator 308, which calculates the updated QoS balance point for each PM based on the proposed job migration. If the updated result improves QoS balancing, then job-migration controller 310 proceeds to move jobs between PMs accordingly. Otherwise, the proposal is abandoned. In addition, risk-correlation calculator 312 calculates the risk-correlation factor and updates the risk-reduction potential based on the proposed job migration.

In one embodiment, the risk-reduction potential is evaluated by measuring the correlation among jobs on a single machine. In a further embodiment, the system measures the mean shift introduced by a proposed job migration. For example, if one job is added to a physical machine, the system can measure the mean shift between the added job and other jobs presently on the machine.

If the updated risk-reduction potential is greater than a predetermined threshold (or if the calculated correlation of risks as the result of the proposed job migration remains smaller than a threshold), job-migration controller 310 proceeds to move jobs. If the updated risk-reduction potential is significantly reduced from its original value (before migration), the system determines that the proposed job migration is not beneficial and refuses such proposal. For example, if a to-be-added job strongly correlates with other jobs presently on the machine (i.e., the likelihood for the to-be-added job and other jobs to simultaneously need large resources is high), then such a migration is not beneficial to the overall system performance.

Figure 4:
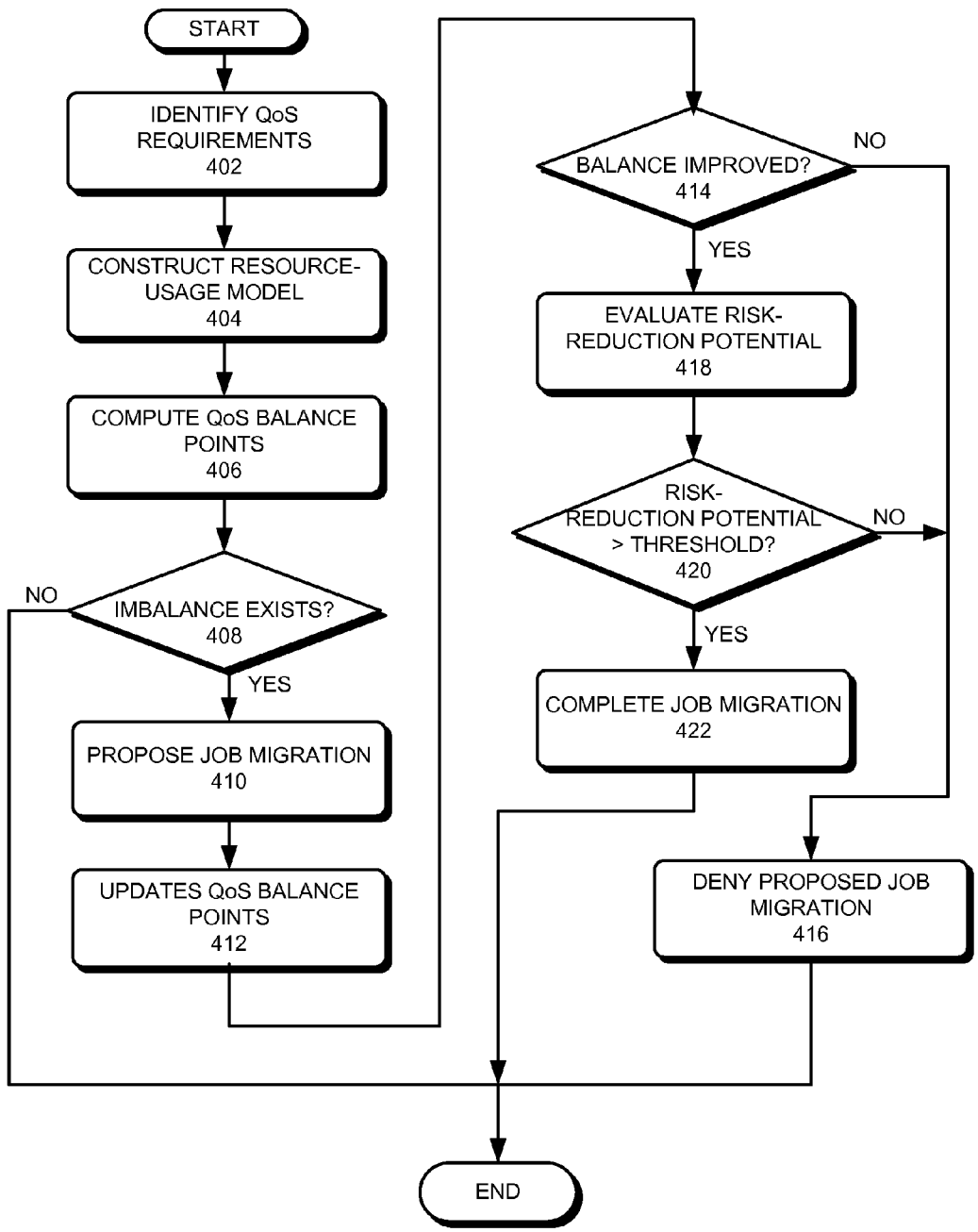
FIG. 4 presents a flowchart illustrating an exemplary job migration process, in accordance with an embodiment of the present invention.

FIG. 4 presents a flowchart illustrating an exemplary job migration process, in accordance with an embodiment of the present invention. During operation, the system identifies QoS requirements for each job in a cluster of machines (operation 402), and constructs a resource-usage model for each job based on the resource-usage history of the job (operation 404). In one embodiment, the resource-usage model includes a resource-usage probability distribution function. In a further embodiment, the resource-usage probability distribution function varies with time.

Subsequently, the system computes a QoS balance point for each PM based on the QoS requirements and resource-usage model for jobs running on the machine (operation 406), and determines whether a QoS imbalance exists between two machines (operation 408). In one embodiment, the calculated QoS balance points are presented to an administrator, who can identify any QoS imbalance within the cluster. If an imbalance exists, the administrator or an automatic controller suggests a job migration that can improve the QoS imbalance between two machines (operation 410). Note that one or more jobs may be involved in the suggested migration.

Based on the suggested job migration, the system recalculates the QoS balance point (in other words, calculates the new balance point after the potential migration) for the two machines (operation 412). The system further determines whether balance is improved (operation 414). If not, the proposed migration is denied (operation 416). If the proposed job migration can improve QoS balance, the system optionally evaluates the risk-reduction potential for the new job distribution (operation 418), and determines whether the newly evaluated risk-reduction potentials for both machines exceed a predetermined threshold (operation 420). If so, the system proceeds to complete the job migration (operation 422). If not, the proposed migration is denied (operation 416).

Computer System

Figure 5:
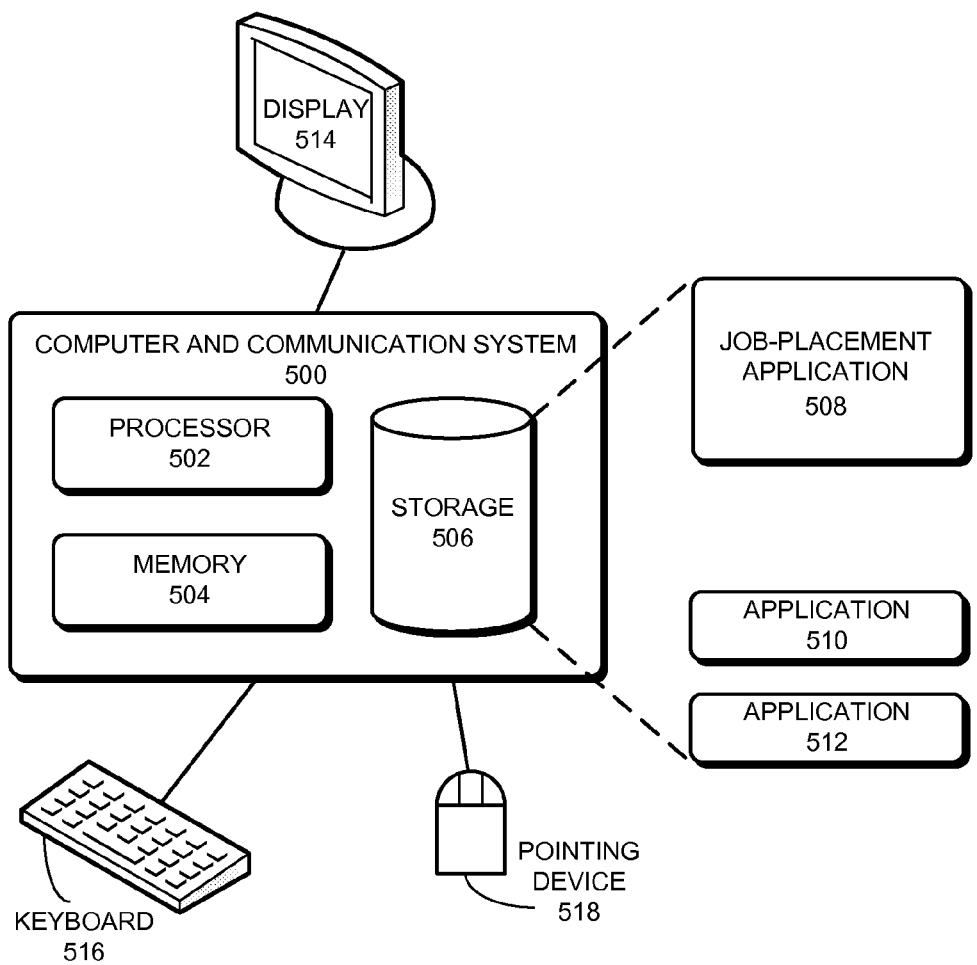
FIG. 5 illustrates an exemplary computer system for placing jobs among machines in a data center, in accordance with one embodiment of the present invention.

FIG. 5 illustrates an exemplary computer system for placing jobs among machines in a data center, in accordance with one embodiment of the present invention. In one embodiment, a computer and communication system 500 includes a processor 502, a memory 504, and a storage device 506. Storage device 506 stores a job-placement application 508, as well as other applications, such as applications 510 and 512. During operation, job-placement application 508 is loaded from storage device 506 into memory 504 and then executed by processor 502. While executing the program, processor 502 performs the aforementioned functions. Computer and communication system 500 is coupled to an optional display 514, keyboard 516, and pointing device 518.

Embodiments of the present invention provide a solution for balancing loads in data centers, particularly in situations where the careful management of QoS is the overriding priority. Careful management of QoS often involves extra reservations to mitigate the risk of insufficient resources. By making reservations as a group, the overall required reservation of physical resources can be reduced. The bottom-line evaluation of the balancing of loads in the data center is the amount of physical resources needed. Hence, embodiments of the present invention use the statistical packing algorithm to make group reservations. In addition to being a good overall metric of how well the data center is balanced, the statistical packing algorithm can be used to evaluate potential migration of jobs to rebalance a data center. More specifically, the physical resources needed before migration can be compared with the physical resources needed afterward in order to judge whether the migration is beneficial. A combination of the QoS consideration and other considerations, such as complementarity of loads and risk-reduction potential, will determine how well the loads are balanced among machines in a data center. These considerations afford human operators, wishing a degree of control over balancing, insights into how well the data center is working. In addition, these considerations also allow automated algorithms to explore the most promising rebalancing acts for performance improvement.

Note that these considerations of balancing can be applied at multiple levels in the data centers, including moving jobs between machines in a cluster, between clusters, or even between data centers, where the QoS performance and the resource utilization can be improved.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for balancing loads between two physical resources, comprising:
 establishing resource usage models for a plurality of jobs sharing a respective physical resource;
 assigning, for each of the plurality of jobs of the respective physical resource, a quality of service (QoS) rating, which includes a positive real number that indicates a QoS requirement associated with the job;
 determining, using a statistical packing algorithm, a subset of jobs that require dedicated resource provisioning based on the resource usage models for the plurality of jobs;
 determining a QoS balance point for the respective physical resource, wherein the QoS balance point indicates a lowest QoS rating of the subset of jobs that require dedicated resource provisioning; and
 in response to determining a first QoS balance point associated with a first physical resource being greater than a second QoS balance point associated with a second physical resource, identifying at least one job to be moved from the first physical resource to the second physical resource, wherein the identified job has a QoS rating greater than the first QoS balance point.

2. The method of claim 1, further comprising:
 presenting the QoS balance points for the first and second physical resources to an administrator; and
 receiving an input, which identifies one or more jobs to be moved between the first physical resource and the second physical resource, from the administrator.

3. The method of claim 1, wherein identifying the job to be moved involves computing a marginal benefit of a move which can reduce a difference between the first QoS balance point and the second QoS balance point; and
 wherein the method further comprises selecting and completing a move based on the computation.

4. The method of claim 1, further comprising:
 determining a correlation of risks affected by a movement of the identified job; and
 in response to the correlation of risks being smaller than a predetermined threshold, completing the movement.

5. The method of claim 1, wherein the resource-usage models are time varying, and wherein the time-varying resource-usage models are established based on resource-usage histories associated with the plurality of jobs.

6. The method of claim 1, further comprising:
 measuring a complementarity level between two or more jobs; and
 in response to the complementarity level exceeding a predetermined threshold, identifying moves that place the two or more jobs on a same physical resource.

7. The method of claim 6, wherein measuring the complementarity level involves calculating a time correlation between peak resource usages associated with the two or more jobs.

8. The method of claim 1, further comprising specifying a job to be placed on a particular physical resource based on one or more of:
 a location of one or more other related jobs;
 a network connectivity requirement associated with the specified job; and
 a security requirement associated with the specified job.

9. The method of claim 1, further comprising:
 identifying at least a second job to be moved from the second physical resource to the first physical resource, wherein the identified second job has a QoS rating less than the second QoS balance point.

10. A non-transitory computer-readable storage medium storing instructions that when executed by a computer cause the computer to perform a method for balancing loads between two physical resources, the method comprising:
- establishing resource usage models for a plurality of jobs sharing a respective physical resource;
- assigning, for each of the plurality of jobs of the respective physical resource, a quality of service (QoS) rating, which includes a positive real number that indicates a QoS requirement associated with the job;
- determining, using a statistical packing algorithm, a subset of jobs that require dedicated resource provisioning based on the resource usage models for the plurality of jobs;
- determining a QoS balance point for the respective physical resource, wherein the QoS balance point indicates a lowest QoS rating of the subset of jobs that require dedicated resource provisioning; and
- in response to determining a first QoS balance point associated with a first physical resource being greater than a second QoS balance point associated with a second physical resource, identifying at least one job to be moved from the first physical resource to the second physical resource, wherein the identified job has a QoS rating greater than the first QoS balance point.

11. The computer-readable storage medium of claim 10, wherein the method further comprises:
- presenting the QoS balance points for the first and second physical resources to an administrator; and
- receiving an input, which identifies one or more jobs to be moved between the first physical resource and the second physical resource, from the administrator.

12. The computer-readable storage medium of claim 10, wherein identifying the job to be moved involves computing a marginal benefit of a move which can reduce a difference between the first QoS balance point and the second QoS balance point; and
- wherein the method further comprises selecting and completing a move based on the computation.

13. The computer-readable storage medium of claim 10, wherein the method further comprises:
- determining a correlation of risks affected by a movement of the identified job; and
- in response to the correlation of risks being smaller than a predetermined threshold, completing the movement.

14. The computer-readable storage medium of claim 10, wherein the resource-usage models are time varying, and wherein the time-varying resource-usage models are established based on resource-usage histories associated with the plurality of jobs.

15. The computer-readable storage medium of claim 10, wherein the method further comprises:
- measuring a complementarity level between two jobs; and
- in response to the complementarity level exceeding a predetermined threshold, placing the two jobs on a same physical resource.

16. The computer-readable storage medium of claim 15, wherein measuring the complementarity level involves calculating a time correlation between peak resource usages associated with the two jobs.

17. The computer-readable storage medium of claim 10, wherein the method further comprises specifying a job to be placed on a particular physical resource based on one or more of:
- a location of one or more other related jobs;
- a network connectivity requirement associated with the specified job; and
- a security requirement associated with the specified job.

18. A computing system for balancing loads between two physical resources, comprising:
- a processor;
- a storage device coupled to the processor and storing instructions which when executed by the processor cause the processor to perform a method, the method comprising:
  - establishing resource usage models for a plurality of jobs sharing a respective physical resource;
  - assigning, for each of the plurality of jobs of the respective physical resource, a quality of service (QoS) rating, which includes a positive real number that indicates a QoS requirement associated with the job;
  - determining, using a statistical packing algorithm, a subset of jobs that require dedicated resource provisioning based on the resource usage models for the plurality of jobs;
  - determining a QoS balance point for the respective physical resource, wherein the QoS balance point indicates a lowest QoS rating of the subset of jobs that require dedicated resource provisioning; and
  - in response to determining a first QoS balance point associated with a first physical resource being greater than a second QoS balance point associated with a second physical resource, identifying at least one job to be moved from the first physical resource to the second physical resource, wherein the identified job has a QoS rating greater than the first QoS balance point.

19. The system of claim 18, wherein the method further comprises:
- presenting the QoS balance points for the first and second physical resources to an administrator; and
- receiving an input, which identifies one or more jobs to be moved between the first and second physical resources, from the administrator.

20. The system of claim 18, wherein identifying the job to be moved involves computing a marginal benefit of a move which can reduce a difference between the first QoS balance point and the second QoS balance point; and
- wherein the method further comprises selecting and completing a move based on the computation.

21. The system of claim 18, wherein the method further comprises:
- computing a correlation of risks affected by a movement of the identified job; and
- in response to the correlation of risks being smaller than a predetermined threshold, completing the movement.

22. The system of claim 18, wherein the resource-usage models are time varying, and wherein the time-varying resource-usage models are constructed based on resource-usage histories associated with the plurality of jobs.

23. The system of claim 18, wherein the method further comprises:
- measuring a complementarity level between two jobs; and
- in response to the complementary level exceeding a predetermined threshold, placing the two jobs on a same physical resource.

24. The system of claim 23, wherein measuring the complementary level involves calculating a time correlation between peak resource usages associated with the two jobs.

25. The system of claim 18, wherein the method further comprises specifying a job to be placed on a particular physical resource based on one or more of:
- a location of one or more other related jobs;
- a network connectivity requirement associated with the specified job to be placed; and
- a security requirement associated with the specified job to be placed.

* * * * *